United States Patent
Friedman et al.

(10) Patent No.: US 9,397,885 B2
(45) Date of Patent: Jul. 19, 2016

(54) CONVEYANCE OF CONFIGURATION INFORMATION IN A NETWORK

(71) Applicants: Robert U Friedman, Westborough, MA (US); Shawn P. Craver, Willington, CT (US); Glenn R. Martin, Quincy, MA (US)

(72) Inventors: Robert U Friedman, Westborough, MA (US); Shawn P. Craver, Willington, CT (US); Glenn R. Martin, Quincy, MA (US)

(73) Assignee: Apperian, Inc., Boston, MA (US)

( * ) Notice: Subject to any disclaimer, the term of this patent is extended or adjusted under 35 U.S.C. 154(b) by 611 days.

(21) Appl. No.: 13/627,533

(22) Filed: Sep. 26, 2012

(65) Prior Publication Data

US 2013/0080636 A1    Mar. 28, 2013

Related U.S. Application Data

(60) Provisional application No. 61/540,210, filed on Sep. 28, 2011.

(51) Int. Cl.
  *G06F 15/173*    (2006.01)
  *H04L 12/24*    (2006.01)

(52) U.S. Cl.
  CPC .................................... *H04L 41/08* (2013.01)

(58) Field of Classification Search
  None
  See application file for complete search history.

(56) References Cited

U.S. PATENT DOCUMENTS

| | | | |
|---|---|---|---|
| 5,838,910 A * | 11/1998 | Domenikos et al. | G06F 9/445 |
| 6,119,157 A * | 9/2000 | Traversat et al. | H04L 29/06 |
| 6,973,499 B1 | 12/2005 | Penden et al. | |
| 8,898,759 B2 * | 11/2014 | Schultz et al. | G06F 21/44 |
| 2002/0109718 A1 | 8/2002 | Mansour et al. | |
| 2003/0018755 A1 * | 1/2003 | Masterson et al. | H04L 12/2803 |
| 2003/0033353 A1 * | 2/2003 | Simpson et al. | H04L 29/06 |
| 2005/0039178 A1 | 2/2005 | Marolia et al. | |
| 2005/0050317 A1 * | 3/2005 | Kramer et al. | G06F 21/606 |
| 2007/0265972 A1 * | 11/2007 | Tsutsui | G06Q 30/06 705/52 |
| 2010/0023520 A1 | 1/2010 | Barboy et al. | |
| 2010/0138905 A1 * | 6/2010 | Kass | G06F 21/33 726/7 |
| 2013/0031184 A1 * | 1/2013 | Avitabile et al. | G06Q 10/109 |

OTHER PUBLICATIONS

International Search Report, dated Nov. 19, 2012, PCT/US2012/57282, pp. 2.
Extended European Search Report, dated May 6, 2015, PCT/US2012057282, pp. 6.

* cited by examiner

*Primary Examiner* — Chris Parry
*Assistant Examiner* — Soe M Hlaing
(74) *Attorney, Agent, or Firm* — Chapin IP Law, LLC

(57) ABSTRACT

According to example configurations, a user of a client device accesses an authentication server to retrieve configuration information. The user belongs to an organization that receives services from a third party service provider. The client device forwards the configuration information to a server controlled by the third party service provider. The server maintained by the third party service provider provides access to services, resources, data, etc., depending on the configuration information forwarded by the client device.

11 Claims, 9 Drawing Sheets

CONVEYANCE OF CONFIGURATION INFORMATION IN A NETWORK

RELATED APPLICATIONS

This application is related to and claims the benefit of earlier filed U.S. Provisional Patent Application Ser. No. 61/540,210 entitled "CONVEYANCE OF CONFIGURATION INFORMATION IN A NETWORK,", filed on Sep. 28, 2011, the entire teachings of which are incorporated herein by this reference.

BACKGROUND

Organizations such as corporations typically own and/or at least maintain a network environment including network resources such as routers, data storage devices, computers, applications, etc., to support different corporate functions. All or part of the network resources (e.g., servers, routers, computers, etc.) of the local network environment may reside within a building owned or leased by the company. Additionally, corporate network domains and corresponding resources can span multiple geographical regions. Appropriate management resources are typically needed to maintain and configure the network.

An example of a management resource that may be present in a corporate network environment is Active Directory (by Microsoft™). In general, Active Directory is a resource to store information and settings for a deployment in a central database and allows administrators to assign policies as well as deploy and update software in a network environment. Active Directory networks can vary from a small installation with a few computers, users, and printers to many thousands of users, many different network domains, and large server farms spanning many geographical locations.

In many cases, a network administrator controls configuration settings of the corporate network environment for each employee in the company via input to the directory. The configuration settings can include employee information as well as indicate what functions each of the employees can perform, access, etc. Configuration settings for the different employees may vary depending on a number of factors such as the title of the employee, job duties of the employee, years of employee experience, functional group to which the employee belongs, etc.

Corporations may require use of third party services that are only available and/or cost-effective if they are obtained from a third party service provider's network. Employees may have to access the third party service provider network to obtain services.

A third party service provider may provide services to a number of different subscriber companies. A network administrator for each of the subscriber companies typically provides configuration information for each of their employees to indicate which of one or more functions available from the third party service provider can be performed by each of the employees.

In certain cases, the configuration information (such configuration settings stored in or accessible to the Active Directory) defining access capabilities of employees in the corporate network environment may be at least partially relied upon for controlling user settings with respect to functionality in the third party service provider.

Even though common configuration settings can be used to define access capability in both the local network environment (e.g., within a corporation's firewall) and the third party service provider environment, the network administrator may have to keep track of and manually provide duplicate configuration settings to multiple different sites. For example, the network administrator may need to store and maintain employee configuration settings in a resource such as an Active Directory to control access within a corporate firewall as well as store and maintain similar or the same information in a storage resource in the third party service provider's network located external to the corporate firewall to control access to resources in the third party service provider's network.

BRIEF DESCRIPTION

One way to synchronize configuration data between the resources inside and outside a corporate firewall is to copy the configuration setting information from one location to another. Copying can be performed by first creating a secure communication link between a resource located inside the corporate firewall and a target resource (e.g., a resource in a third party service provider's provider network) outside the corporate firewall. After creating the secured communication link, the network administrator can initiate forwarding of the configuration information over the secured communication link to the target resource.

Use of this technique to copy or update configuration information from one network environment over a dedicated communication link to another network outside a corporate firewall suffers from deficiencies. For example, as mentioned, in many instances, an organization typically installs a firewall to protect their data from outside attacks. Setting up a dedicated communication link (even though the link may be encrypted) through a firewall to pass corporate information to an external network operated by a third party is often undesirable, especially when the third party service provider's network provides services to a number of different companies. The network administrator may feel that the connection through the company's firewall increases a possibility of a network attack. Setting up a dedicated connection through the firewall also can be cumbersome and time consuming.

Embodiments herein deviate with respect to conventional techniques. For example, one embodiment herein includes a novel technique of conveying configuration information from one network to another network through a client device operated by a user. Another embodiment herein includes a way to automate provisioning in a third party network based on the configuration information received from the client device.

More specifically, according to one embodiment, a network administrator configures a repository inside a corporate firewall to include settings associated with users such as multiple employees. The network administrator can configure an external repository (to which a third party service provider has access) located outside the corporate firewall with at least access rights information.

A user of a client device communicates with an authentication server to retrieve configuration information stored in a repository located inside the corporate firewall. The authentication server transmits the configuration information over a first communication link to the user of the client device. To obtain services, resources, etc., from a third party service provider, the user of the client initiates communication with a third party server located outside of the corporate firewall. For example, the user of the client device initiates transmission of the retrieved configuration information from the client device over a second secured communication link to the third party server.

In one embodiment, the third party server stores the received configuration information in a repository maintained by the third party. Accordingly, one embodiment herein includes retrieving configuration information from one repository, passing the configuration information through a client device, and storing the configuration information in another repository. Both the first communication link and the second communication link can be encrypted.

In accordance with further embodiments, the third party server utilizes the configuration information provided by the user to identify a service, resource, application, etc., that is to be provided to the user. As an example, in one embodiment, the third party server uses the configuration information to identify a corresponding set of applications in a library that are to be made accessible to the user.

More specifically, the configuration information provided by the client can be a group identifier value indicating a group to which the user belongs. The third party server maps the group identifier value received from the client device to corresponding access rights information. The access rights information can be configuration information generated by the network administrator and stored in a repository external to the firewall.

Via the configuration information such as the group identifier value received from the user of the client device and corresponding access rights information retrieved from the third party service provider's network, the third party server identifies which of one or more applications are to be made accessible to the user. The user may be restricted from accessing an application in a library of applications depending on a group to which the user is assigned. The third party server makes an appropriate set of applications available to the user of the client device in accordance with the one or more groups to which the user is assigned.

Thus, configuration information conveyed by a respective client device from a repository in a first network (and inside a firewall) can be conveyed and stored in a repository of a second network (operated by a third party service provider) outside the firewall. In addition to storage and updating the repository in the second network, the configuration information received through the client device can be used by the third party service provider to identify which resources such as services, applications, data, etc., to make available to a user of the client device.

As discussed above, techniques herein are well suited for use in managing and using configuration information associated in a network environment. However, it should be noted that embodiments herein are not limited to use in such applications and that the techniques discussed herein are well suited for other applications as well.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations as discussed herein. One such embodiment comprises a computer program product including a non-transitory computer-readable storage medium (i.e., any suitable computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other medium such as firmware or microcode in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, one particular embodiment of the present disclosure is directed to a method and computer program product that includes a computer readable hardware storage medium having instructions stored thereon. For example, in one embodiment, the instructions, when executed by a processor of a respective computer device, cause the processor to: from a client device, communicate with an authentication server to retrieve configuration information assigned to a user of the client device; transmit retrieved configuration information from the client device to an application server, the application server utilizing the configuration information to identify a corresponding set of applications that are accessible to the user; and receive access to the corresponding set of applications through the client device.

Another embodiment herein is directed to a method and computer program product that includes a computer readable storage medium having instructions stored thereon for supporting novel communications. For example, in one embodiment, the instructions, when executed by a processor of a respective computer device, cause the processor to: store access rights information for a particular configuration setting; receive metadata from a user of a client device, the metadata specifying that the user has been assigned the particular configuration setting; and in response to detecting that the user has been assigned the particular configuration setting, from an application server, provide the user access to a set of at least one application in an application library in accordance with the access rights information.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

Figure 1:
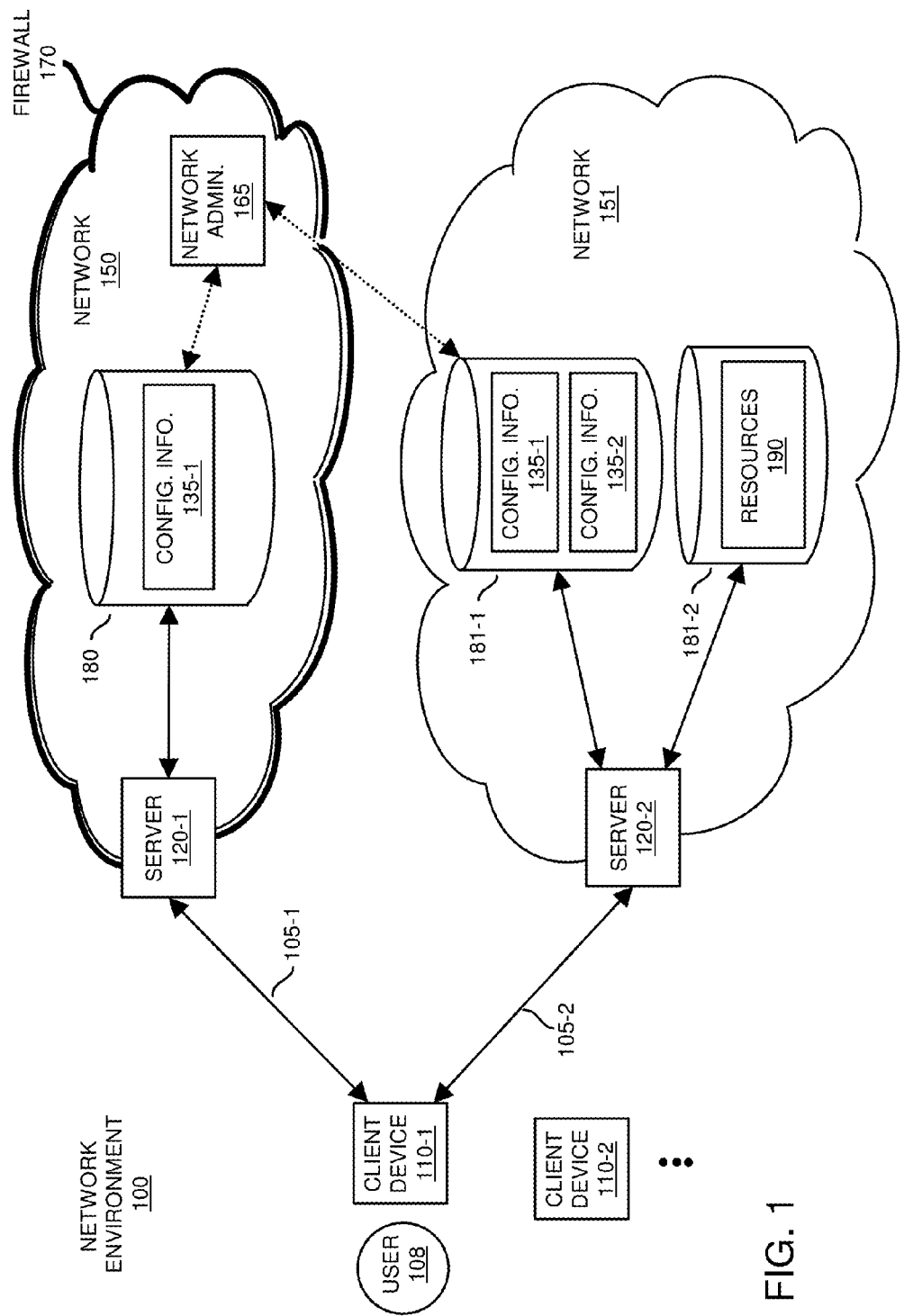
FIG. 1 is an example diagram of a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to example configurations, a user of a client device accesses an authentication server to retrieve configuration information. The user belongs to an organization whose members receive access to resources from a third party service provider. The client device forwards the configuration information to a server controlled by the third party service provider. The server maintained by the third party service provider provides access to resources such as services, applications, data, etc., depending on the configuration information forwarded by the client device. The configuration information can be stored in a repository controlled by the third party service provider.

FIG. 1 is an example diagram of a network environment according to embodiments herein.

In accordance with one embodiment, network environment 100 includes multiple client devices 110 including client device 110-1, 110-2, etc. Each of the client devices 110 can be operated by a respective user such as an employee of a respective organization such as a company, social network, etc.

The client devices 110 provide access to one or more resources residing within network environment 100 such as resources in network 150, resources in network 151, etc.

Each of network 150 and network 151 can include any suitable type of resources such as a computers, routers, servers, etc., to support functions of the organization.

In accordance with further embodiments, network 150 represents a group of resources managed by network administrator 165 within firewall 170. The firewall 170 can be any suitable hardware and/or software to permit or deny network transmissions based upon a set of rules in order to protect the network 150 from unauthorized access while permitting legitimate communications to pass.

By way of a non-limiting example, each of the client devices 110 can be a mobile device such as a cell phone, personal digital assistant, portable computer device, iPhone™, iPad™, etc., operated by a respective user of an organization. Additionally, note that any of one or more of the client devices 110 can be coupled to communicate with a respective network 150 or 151 via a hardwired link such as a cable modem, telephone line, network cable, etc. Accordingly, each communication link 105 (e.g., communication link 105-1 and communication link 105-2) can be a wireless and/or hardwired communication link between client device 110-1 and a respective server (e.g., server 120-1 or server 120-2).

In one embodiment, network 151 is owned and/or managed by a third party such as a third party service provider that provides services to one or more different organizations including members of the organization that manages network 150. The network 151 may provide services that are more cost effective to provide from the third party's server as opposed to installing resources within network 150 to provide the desired services.

As mentioned, network administrator 165 oversees network 150 and its respective resources. In one embodiment, the network administrator 165 configures the repository 180 inside the firewall 170 to include configuration information 135-1 (e.g., settings information) associated with each of the users (e.g., employees, members, etc.) in the organization. In certain cases, the network administrator 165 can configure repository 181-1 with configuration information 135-2 such as access rights information indicating which resources 190 (such as resources in network 151) are accessible to each of multiple different groupings or types of users in the organization.

As shown, the repository 181-1 resides within network 151 (e.g., a third party network domain) managed by a respective third party service provider with respect to the organization. Note that the repository 181-1 resides outside or external to the firewall 170. The service provider managing resources in network 151 can receive configuration information 135-2 from the network administrator 165. The network administrator 165 can transmit the configuration information 135-2 to the third party service provider's network via any suitable type of connection.

To obtain services such as access to data, applications, etc., as provided by network 151, the user 108 of client device 110-1 initially communicates with server 120-1 to retrieve configuration information 135-1 stored in the repository 180 located inside the firewall 170. The server 120-1 may require that the user 108 provide, through the client device 110-1 and over communication link 105-1, a user identifier and respective password to access configuration information 135-1 associated with the user 108.

Communication link 105-1 can be configured to support encrypted communications to prevent authorized parties from retrieving data passed between client device 110-1 and server 120-2.

In response to a request received from the client device 110-1, the server 120-1 retrieves appropriate configuration information 135-1 from server 120-1. The server 120-1 transmits the configuration information 135-1 over communication link 105-1 to the user 108 of the client device 110-1.

To obtain services, resources, etc., from a third party service provider, the user 108 of the client device 110-1 initiates communication with server 120-2 located in a network 151 outside of the firewall 170. In one embodiment, the communication link 105-2 between the client device 110-1 and the server 120-2 is a secured link. That is, communications can be encrypted to prevent unauthorized parties from gaining access to sensitive data.

In accordance with further embodiments, the user 108 of the client device 110-1 initiates transmission of the retrieved configuration information 135-1 from the client device 110-1 over communication link 105-2. In one embodiment, as mentioned, a third party service provider controls operation of server 120-2 and network 151.

The server 120-2 can be configured to store the configuration information received from the client device 110-1 in repository 151 as configuration information 135-2. Accordingly, one embodiment herein includes retrieving configuration information from repository 180, passing the configuration information 135-1 through client device 110-1, and storing the configuration information 135-1 in repository 181-1.

In accordance with further embodiments, the server 120-2 can be configured to utilize the configuration information received from the user 108 to identify a service, resource, application, data, etc., that is to be provided to the user 108.

Figure 2:
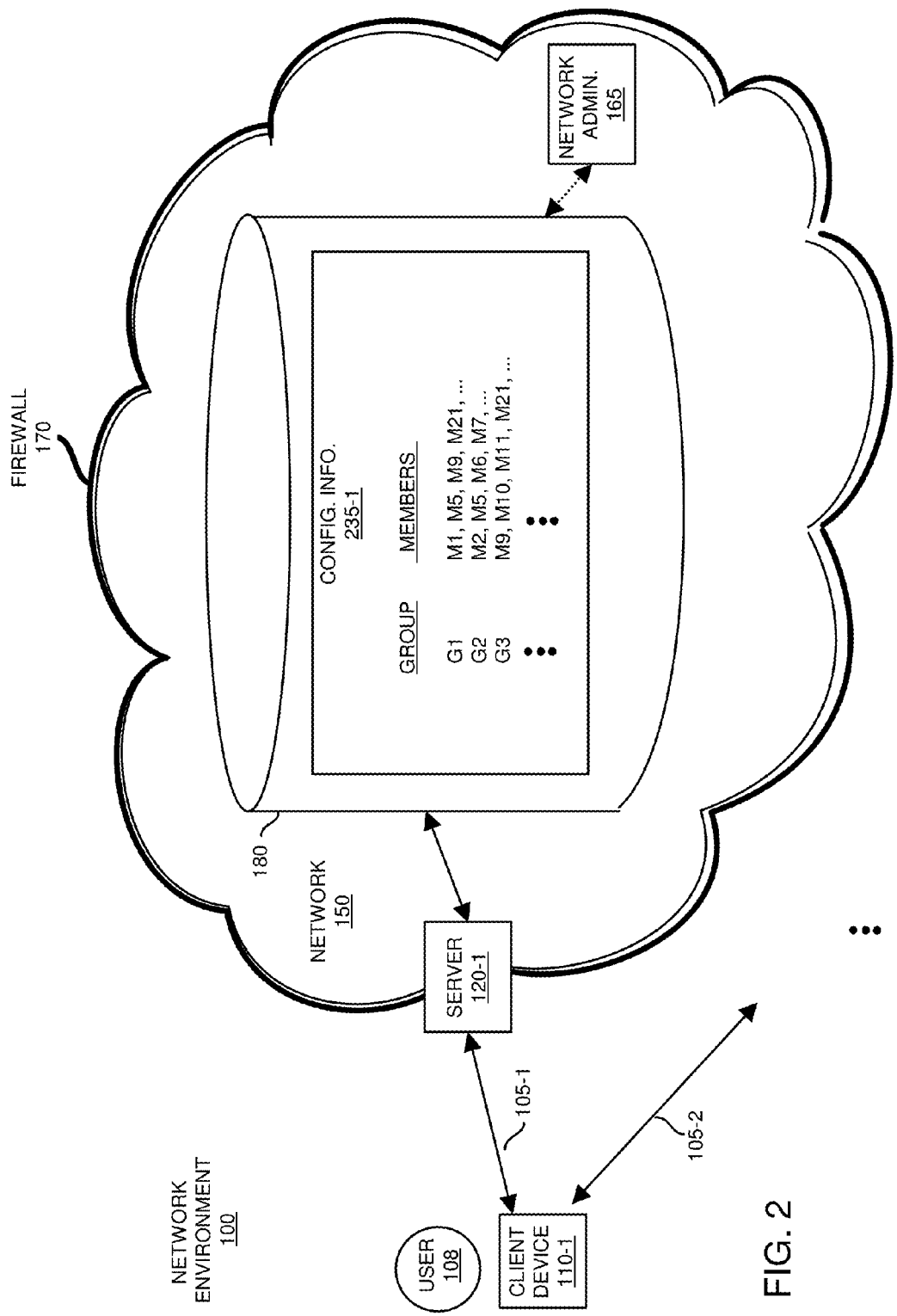
FIG. 2 is an example diagram illustrating authentication of a client device and retrieval of configuration information according to embodiments herein.
Figure 3:
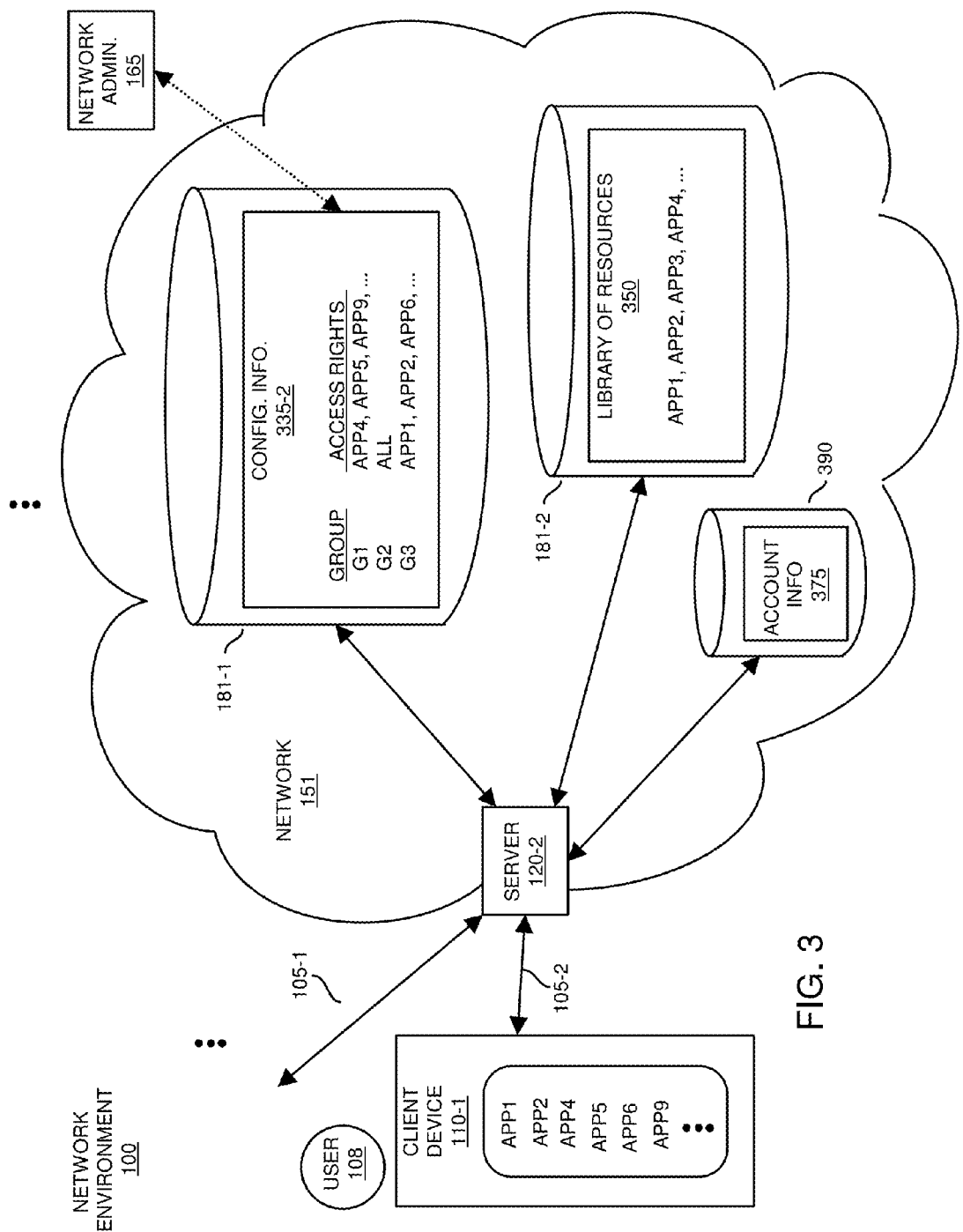
FIG. 3 is an example diagram illustrating processing and use of retrieved configuration information according to embodiments herein.

FIGS. 2 and 3 are example diagrams illustrating more details of a network environment according to embodiments herein.

In the example embodiment of FIG. 2, the network administrator 165 stores appropriate configuration information 235-1 for each of multiple groups and respective users in an organization. The configuration information 235-1 (i.e., settings) stored in repository 180 for the different employees may vary depending on a number of factors such as the title of the employee, job duties of the employee, years of employee experience, functional group to which the employee belongs, etc.

Configuration information 235-1 indicates different groups in the organization and corresponding members in the groups. By way of a non-limiting example, group G1 may represent members in a sales department of the organization; group G2 may represent members in the engineering department of the organization; G3 may represent members of the cross-functional team in the organization; and so on.

The configuration information 235-1 can be used as a basis for determining which services, resources, data, etc., available from network 150 and from within firewall 170 can be accessed by each respective user of the organization. Additionally, as discussed below, the configuration information 235-1 can be at least partially used as a basis for restricting and/or providing access to resources, services, data, etc., provided by a third party service provider outside the firewall 170.

Each of members M1, M2, M3, M4, . . . in configuration information 235-1 represents a member such as an employee in the organization. As shown, group G1 includes members M1, M5, M9, M21, etc.; group G2 includes members M2, M5, M6, M7, etc.; group G3 includes members M9, M10, M11, M21, etc.; and so on. Note that a given member can be included in multiple different groups.

As previously discussed, the client device 110-1 can be a mobile device operated by user 108. The user generates the request for configuration information 235-1 from server 120-1 based on a desire by the user 108 to access resources and/or use one or more services provided by network 151.

More specifically, assume in this example that the user would like to view a list of downloadable applications that are available to the user via network 151. In such an instance, the user executes an appropriate application on the client device 108 to view the list of available applications. The user 108 may be restricted from viewing every available application depending on the one or more groups to which the user 108 belongs. In other words, the user 108 can be restricted to viewing only resources that the user 108 is authorized to download.

Via input to the application executing on the client device 110-1, the user 108 utilizes client device 110-1 to set up communication link 105-1 and communicate with server 120-1 to retrieve configuration information from repository 180 such as the group identifier values indicating to which one or more groups the user belongs. Assume that the user 108 in this example represents member M9.

In one embodiment, the server 120-1 authenticates the user 108 based on an identifier and password associated with the user 108 as received from the client device 110-1. In this example, via the authentication, assume that the server 120-1 detects that the user 108 is member M9.

Based on the request received from client device 110-1 to access and/or view services and/or resources available to the user 108 from the network 151, the server 120-1 maps the member identifier M9 to one or more groups to which the user 108 belongs. In this instance, the user 108 (i.e., member M9) belongs to groups G1 and G3. Hence, the server 120-1 maps the member identifier M9 to configuration information group identifier values G1 and G3. Server 120-1 forwards the group identifier value G1 and G3 to client device 110-1.

In addition to the group identifier values, note that the server 120-1 can forward additional metadata to the user 108 of client device 110-1 such as a name of the user, e-mail of the user, etc.

Thereafter, in accordance with FIG. 3, the client device 110-1 uses the retrieved configuration information (e.g., information indicating that the user is a member of groups G1 and G3) to view a corresponding set of applications in a library that are accessible to the user 108. For example, via client device 110-1, the user 108 communicates metadata including values for group identifier value G1 and group identifier value G3 to the server 120-2.

Also, in a manner as previously discussed, note that the network administrator 165 can provide configuration information 335-2 for storage in repository 181-1. The network administrator 165 can manage, download, modify, etc., configuration information 335-2 via any suitable type of connections such as using a browser and providing such information over a network connection between the browser and the server 120-2 (or other resource) in network 151.

As shown, configuration information 335-2 indicates that members having been assigned group identifier value G1 will be given access to applications APP4, APP5, APP9, etc.; members having been assigned group identifier value G2 will be given access to ALL applications; members having been assigned group identifier value G3 will be given access to applications APP1, APP2, APP6, etc.;

In furtherance of requesting access or use of services, resources, data, etc., from network 151, the client device 110-1 forwards the metadata (including group identifier values) received from server 120-1 to server 120-2. As mentioned, the metadata can include the name of the user 108, e-mail of the user 108, group identifier values such as G1 and G3 to which the user 108 belongs, as well as any other suitable information.

In one embodiment, the server 120-2 utilizes the received metadata received from the client device 108 to determine whether an account already exists for the user 108. For example, the server 120-2 can be configured to compare the metadata received from the client device 110-1 with existing account information 375 to identify whether an account already exists for the user 108.

In response to detecting that no account currently exists for the user 108, the server 120-2 initiates creating a new account for the user 108. The server 120-2 can utilize the received metadata (or any part thereof) to create the new account for the user 108 and may request additional information from the user 108 to create the account. The server 120-2 stores the new account information in repository 390. The account information can include information such as the identifier value of the user, the user's e-mail address, and the group identifier values indicating to which of one or more groups the user 108 belongs.

In response to detecting that an account already exists for the user 108, the server 120-2 verifies whether any or all of the metadata received from the server 120-1 through the client device 110-1 has changed for the user 108. For example, the network administrator may change (e.g., add or remove) the user from a respective group. In such an instance, the server 120-2 utilizes the received metadata to update information associated with the user's account so that it is current. Accordingly, the configuration information received from the client device 110-1 can be used to update the respective account information for the user 108. Thus, the configuration information in each of the networks can be synchronized via communication though the client devices 110.

The server 120-2 retrieves the configuration information (e.g., group identifier values G1 and G3 in this instance) from the metadata that is received from the client 110-1. The server 120-2 maps each of the received group identifier values to corresponding resources to which the user 108 is to be provided access.

For example, using configuration information 335-2 previously provided by the network administrator 165, the server 120-2 maps the group identifier value G1 to multiple applications APP4, APP5, APP9, etc. Additionally, using configuration information 335-2 previously provided by the network administrator 165, the server 120-2 maps the group identifier value G3 to multiple applications APP1, APP2, APP6, etc.

Repository 181-2 in network 151 includes library of resources 350. By way of a non-limiting example, the library of resources 350 includes multiple different applications that can be downloaded to a respective client device for use by an employee of the organization. The library of resources 350 can include applications, data, services, etc., provided by any source. In one embodiment, network administrator 165 can initiate downloading and storage of the applications in repository 350.

As mentioned, the user 108 can be restricted from accessing certain applications in a library of resources 350. The server 120-2 makes an appropriate set of applications available and downloadable to the user depending on the groups to which the user belongs.

In this example, the server 120-2 identifies that the user 108 is a member of groups 1 and 3 because the user 108 has been assigned group identifier value G1 and group identifier value G3. Accordingly, the server 120-2 provides notification over communication link 105-2 to client device 110-1 that the user 108 can access and/or download applications APP4, APP5, APP9, etc., as well as applications APP1 APP2, APP6, etc.

The application executed on client device 110-1 can be configured to initiate display of one or more selectable icons on a display screen of the client device 110-1 such that the user 108 is able to selectively download the applications available to the user 108.

For example, in one embodiment, the display screen of the client device 110-1 can include a listing or display of the available applications. In this instance, the client device 110-1 displays an icon on the display screen for selecting and downloading APP1; the client device 110-1 displays an icon on the display screen for selecting and downloading APP2; the client device 110-1 displays an icon on the display screen for selecting and downloading APP4; the client device 110-1 displays an icon on the display screen for selecting and downloading APP5; the client device 110-1 displays an icon on the display screen for selecting and downloading APP6; the client device 110-1 displays an icon on the display screen for selecting and downloading APP9, and so on.

Selection of an icon on the display screen of the client device 110-1 causes the client device 110-1 to communicate with server 120-2 to retrieve the selected application associated with the selected icon. The server forwards the selected application to the client device 110-1.

As mentioned, each of the users in the organization can access different resources depending on the configuration information assigned to a respective user. As an example, member M2 as indicated by configuration information 235-1 is assigned group identifier value G2. Configuration information 335-2 indicates that members of G2 can be provided access to ALL applications in library of resources 350. Accordingly, the user M2 would be able to select and download any of the applications stored in the library of resources 350.

As another example, member M1 as indicated by configuration information 235-1 is assigned group identifier value G1. Configuration information 335-1 indicates that members of G1 can be provided access to applications APP4, APP5, APP9, etc., in library of resources 350. Accordingly, in a manner as previously discussed, the user M2 would be able to select and download any of the applications APP4, APP5, APP9, etc., stored in the library of resources 350.

Thus, via the configuration information such as one or more group identifier values received from the user of the client device and corresponding access rights information stored in a repository accessible to the service provider (e.g., server 120-2), a third party server such as server 120-2 can identify which of one or more applications, services, data, are to be made accessible to a respective user.

Embodiments herein reduce an amount of configuration information that must be duplicated by the network administrator 165 in multiple different locations. For example, the network administrator 165 may access network 151 and store configuration information 335-2 in repository 181-1. However, the client devices 110 in a respective organization can be configured to convey appropriate portions of the configuration information 235-1 to the network 151.

In alternative embodiments, note that any or all of the configuration information can be conveyed from a repository in network 150 through each of one or more client devices for storage in a repository in network 151 operated by a third party service provider. This can further alleviate the need for the network administrator to convey the configuration information to a third party service provider.

Also, as discussed herein, resources in a third party service provider network can be automatically provisioned to provide access to resources depending on the configuration information provided by a respective client device.

Figure 4:
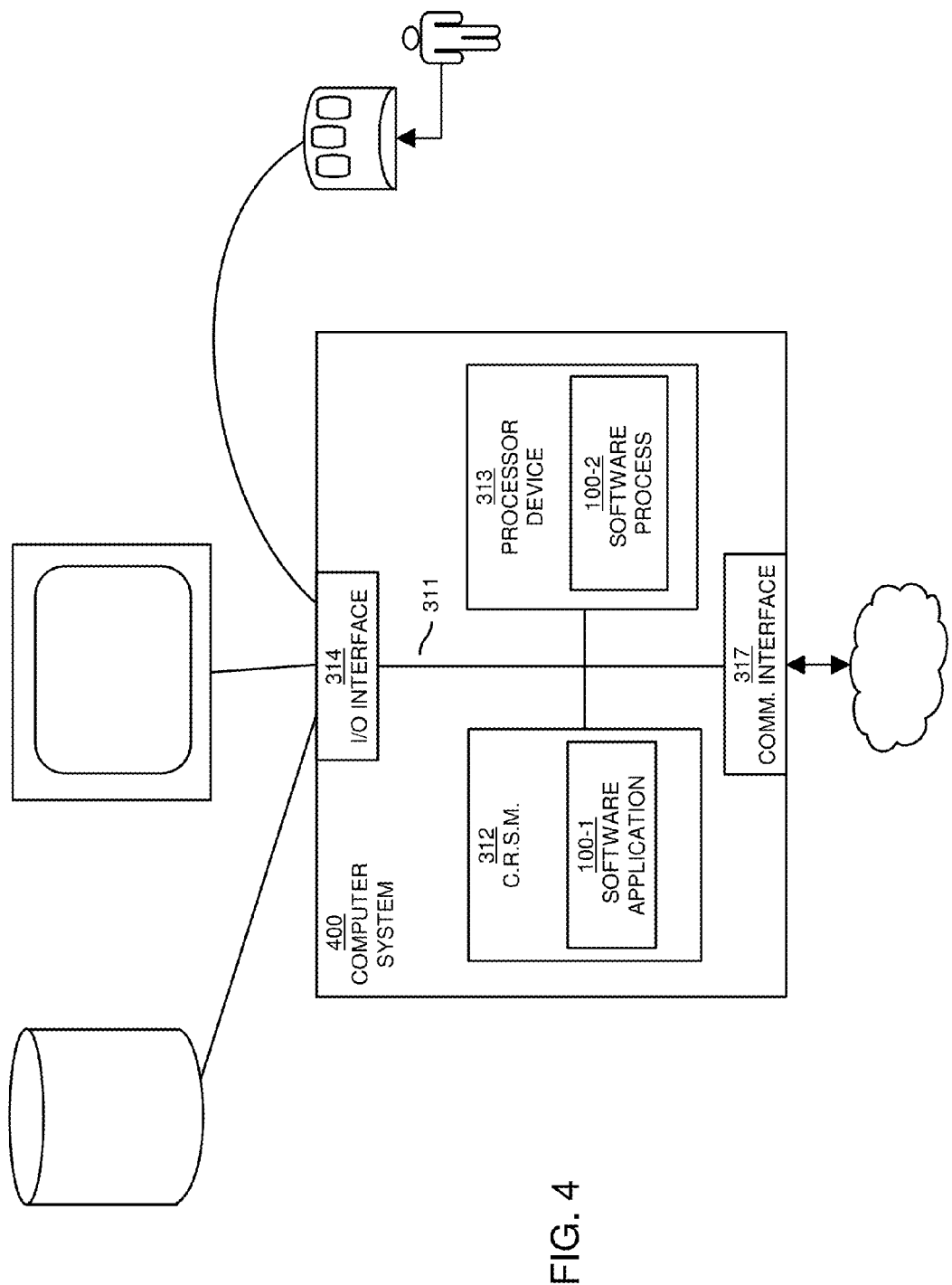
FIG. 4 is an example diagram illustrating an example computer architecture for implementing functionality according to embodiments herein.

FIG. 4 is an example block diagram of a computer hardware system for executing operations according to embodiments herein. Any of the hardware discussed herein such as server 120-1, server 120-2, client device 110-1, client device 110-2, etc., can be configured with computer system 400 to execute operations as discussed herein. In other words, each of resources such as server 120-1, server 120-2, client device 110-1, client device 110-2, etc., can be configured to perform the operations as discussed herein based on software and a corresponding process executed in a computer system residing therein.

Computer system 400 (e.g., computer hardware, software, etc.) can be or include one or more computerized devices such as a personal computer, workstation, portable computing device, console, network terminal, processing device, network device, etc., operating as a server, client, etc.

Note that the following discussion provides a basic embodiment indicating how to execute functionality according to embodiments herein. However, it should be noted that the actual configuration for carrying out the operations as described herein can vary depending on a respective application.

As shown, computer system 400 of the present example includes an interconnect 311 that couples computer readable storage media 312 such as a non-transitory type of computer readable storage media in which digital information can be stored and/or retrieved, a processor device 313, I/O interface 314, a communications interface 317, etc.

I/O interface 314 provides connectivity to different resources such as a repository, display screen, keyboard, computer mouse, etc.

Computer readable storage medium 312 can be any suitable device such as memory, optical storage, hard drive, floppy disk, etc. In one embodiment, the computer readable storage medium 312 is a non-transitory computer readable storage media (e.g., any hardware storage media) to store instructions and/or data.

Communications interface 317 enables the computer system 400 and processor device 313 to communicate over a network to retrieve information from remote sources and communicate with other computers. I/O interface 314 enables processor device 313 to retrieve respective information from a repository.

As shown, computer readable storage media 312 can be encoded with software application 100-1 (e.g., software, firmware, etc.) executed by processor 313.

During operation of one embodiment, processor device 313 accesses computer readable storage media 312 via the use of interconnect 311 in order to launch, run, execute, interpret or otherwise perform the instructions of software application 100-1 stored on computer readable storage medium 312. Software application 100-1 can include appropriate instructions, logic, etc., to carry out any or all functionality associated with the resources (e.g., clients, servers, notification network, network administrator, etc.) in network environment 100 as discussed herein.

Execution of the software application 100-1 produces processing functionality such as software process 100-2 in processor device 313. In other words, the software process 100-2 associated with processor device 313 represents one or more aspects of executing software application 100-1 within or upon the processor device 313 in the computer system 400.

Those skilled in the art will understand that the computer system 400 can include other processes and/or software and hardware components, such as an operating system that controls allocation and use of hardware resources to execute software application 100-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by resources in network environment 100 and resources therein will now be discussed via flowcharts in FIGS. 5-9. Note that there will be some overlap with respect to concepts discussed above for FIGS. 1 through 4. Also, note that the steps in the below flowcharts need not always be executed in the order shown. That is, the steps can be executed in any suitable order.

Figure 5:
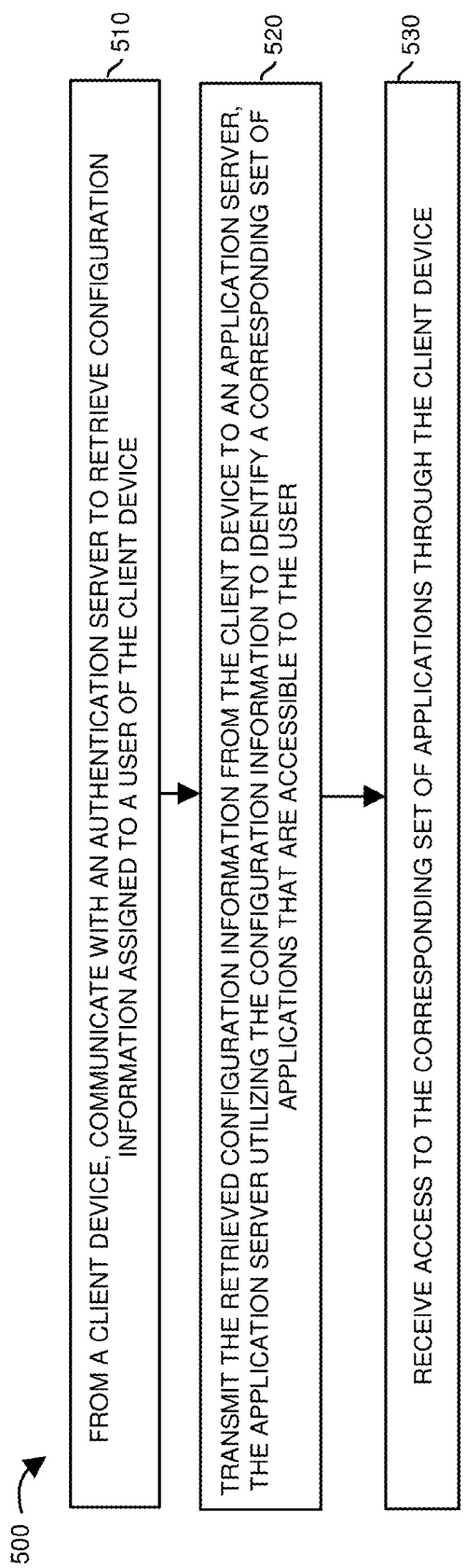
FIG. 5 is a flowchart illustrating an example method implemented by a client device according to embodiments herein.

FIG. 5 is a flowchart 500 illustrating a general technique of utilizing configuration information according to embodiments herein.

In step 510, the client device 110-1 communicates with a server 120-1 (e.g., an authentication server) to retrieve configuration information 135-1 assigned to a user 108 of the client device 110-1.

In step 520, the client device 110-1 transmits the retrieved configuration information 135-1 from the client device 110-1 to server 120-2; the server 120-2 (e.g., a third party service provider server) utilizes the configuration information 135-1 to identify a corresponding set of applications that are accessible to the user 108.

In step 530, the client device 110-1 receives access to the corresponding set of applications through the client device 108.

Figure 6:
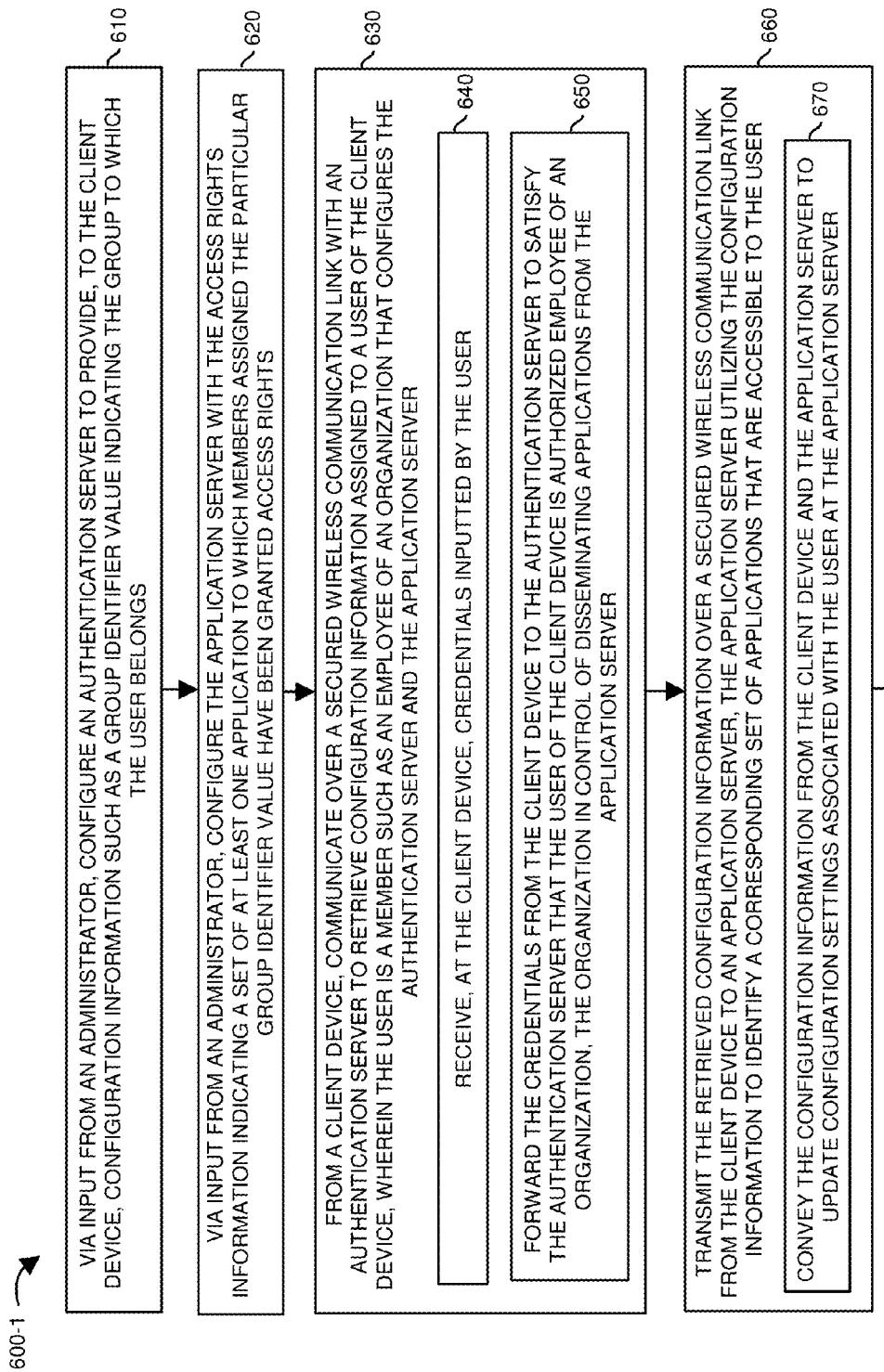
FIGS. 6 and 7 combine to form a flowchart illustrating an example method implemented by a client device according to embodiments herein.
Figure 7:
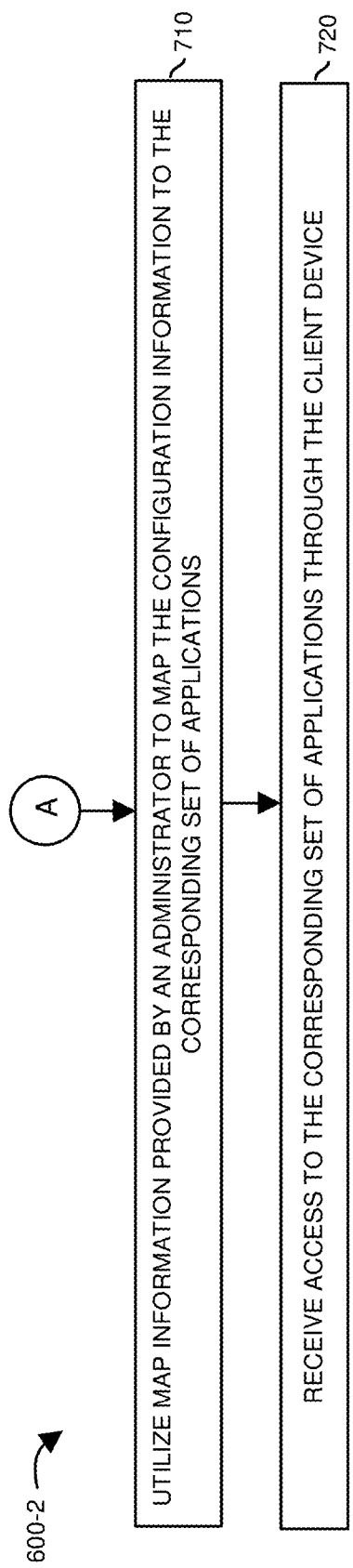

FIGS. 6 and 7 combine to form a flowchart 600 (e.g., flowchart 600-1 and flowchart 600-2) illustrating a more detailed method of provisioning according to embodiments herein.

In step 610, a network administrator 165 configures server 120-1 to provide, to a client device 110-1, configuration information such as a group identifier value indicating the group to which the user 108 belongs.

In step 620, a network administrator 165 configures the server 120-2 with access rights information indicating a set of at least one application to which members assigned the particular group identifier value have been granted access rights.

In step 630, client device 110-1 communicates over a communication link 105-1 with server 120-1 to retrieve configuration information assigned to the user 108 of the client device 110-1. The user 108 may be a member such as an employee of an organization that configures the server 120-1 and/or the server 120-2.

In sub-step 640, the client device receives credentials (e.g., name, password, etc.) inputted by the user 108.

In sub-step 650, the client device 110-1 forwards the credentials from the client device 110-1 to the server 120-1 to satisfy the server 120-1 and/or second server 120-2 that the user 108 of the client device 110-1 is an authorized employee of an organization that controls access to and/or dissemination of resources from the server 120-2.

In step 660, the client device 110-1 transmits the retrieved configuration information over communication link 105-2 from the client device 110-1 to server 120-2. The server 120-2 utilizes the configuration information received from the client device 110-1 to identify a corresponding set of resources that are accessible to the user 108.

In sub-step 670, the client device 110-1 conveys the configuration information from the server 120-1, through the client device 110-1, to the server 120-2 to update configuration settings associated with the user 108 at the server 120-2.

In step 710 of flowchart 600-2 in FIG. 7, the server 120-2 utilizes map information provided by an administrator to map the configuration information to the corresponding set of applications that are accessible to the user 108.

In step 720, the user 108 receives access to the corresponding set of applications through the client device 110-1.

Figure 8:
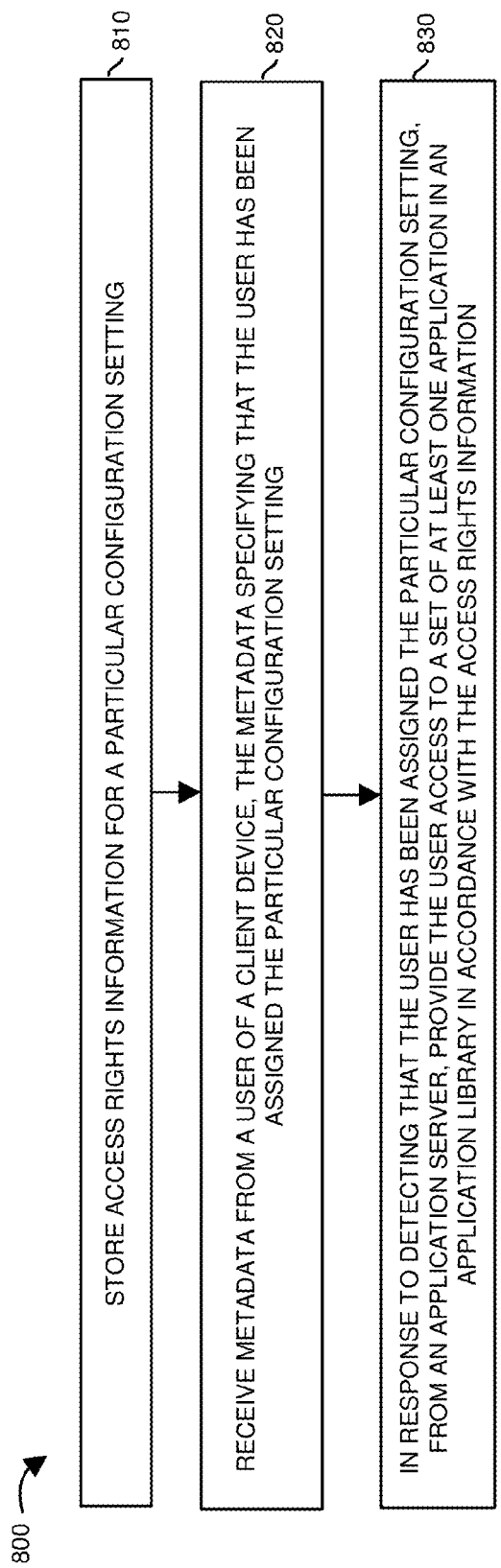
FIG. 8 is a flowchart illustrating an example method implemented by a resource manager according to embodiments herein.

FIG. 8 is a flowchart 800 illustrating a general technique of provisioning according to embodiments herein.

In step 810, the third party service provider in network 151 stores access rights information for a particular configuration setting.

In step 820, the server 120-2 receives metadata from a user 108 of the client device 110. The metadata specifies that the user 108 has been assigned the particular configuration setting stored in a repository of the network 151.

In step 830, in response to detecting that the user 108 has been assigned the particular configuration setting, the server 120-2 provides the user 108 access to a set of at least one application in library of resources 350 in accordance with the access rights information (e.g., configuration information 335-2).

Figure 9:
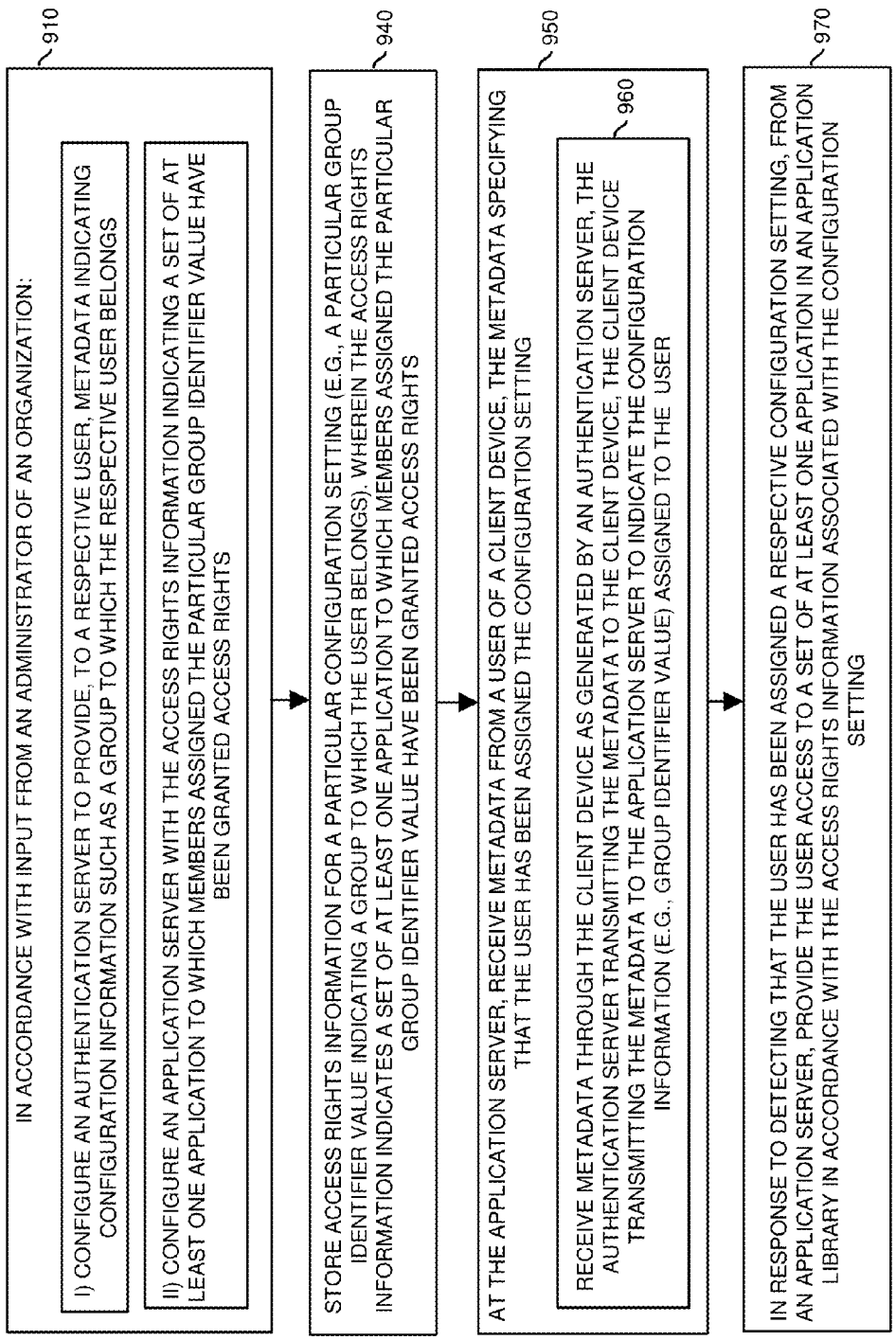
FIG. 9 is a flowchart illustrating an example method implemented by a resource manager according to embodiments herein.

FIG. 9 is a flowchart 900 illustrating a technique of provisioning according to embodiments herein.

In step 910, the network administrator 165: i) configures server 120-1 to provide, to a respective user, metadata indicating configuration information such as a group to which the respective user belongs, and ii) configures a server 120-2 or network 120-2 with the access rights information indicating a set of at least one application to which members assigned the particular group identifier value have been granted access rights.

In step 940, the repository 181-1 stores access rights information for a particular configuration setting (e.g., a particular group identifier value indicating a group to which the user belongs). The access rights information indicates a set of at least one application to which members assigned the particular group identifier value have been granted access rights.

In step 950, the server 120-2 receives metadata from the user 108 of client device 110-1. The metadata specifies at least in part that the user 108 has been assigned the particular configuration setting.

In sub-step 960, the server 120-2 receives metadata through the client device 110-1 as generated and provided by server 120-2. The server 120-2 transmits the metadata to the client device 110-1. The client device 110-1 transmits the metadata to the server 120-2 to indicate the configuration information (e.g., group identifier value) assigned to the user 108.

In step 970, in response to detecting that the user 108 has been assigned a respective configuration setting, the server 120-2 provides the user 108 access to a set of at least one application in an application library (e.g., library of resources 350) in accordance with the access rights information associated with the user's configuration setting.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   forwarding credentials from a client device to a first server to satisfy the first server that a user of the client device is an authorized employee of a respective organization, the first server being an authentication server, the respective organization in control of disseminating applications from an application server;
   subsequent to forwarding the credentials, from the client device, communicating with the first server to retrieve configuration information assigned to the user of the client device, the configuration information including a group identifier value indicating a group to which the user belongs, the first server providing access to a repository within a firewall of the respective organization to which the user belongs, the repository within the firewall accessed by the first server to retrieve and forward the configuration information to the user;
   transmitting the configuration information retrieved from the client device to the application server, the configuration information indicating to the application server of a corresponding set of applications in which to provide the user access, the application server utilizing the configuration information to identify the corresponding set of applications that are accessible to the user; and
   in response to transmitting the configuration information to the application server, receiving access to the corresponding set of applications from the application server through the client device;
   wherein the client device transmits the configuration information to the application server to indicate that the user is a member of the group as specified by the group identifier value;
   wherein a network administrator of the respective organization produces and supplies the configuration information to the repository within the firewall for distribution of the configuration information by the first server;

wherein the network administrator supplies the configuration information to the application server; and wherein the application server provides the user access to the corresponding set of applications stored in a repository located external to the firewall, the application server providing the user access as specified by the configuration information;

wherein receiving access to the corresponding set of applications further comprises:

at the client device:

receiving identities of the corresponding set of applications available to the user of the client device;

initiating display of the identities on a respective display screen of the client device; and in response to receiving selection of an identity of a particular application displayed on the respective display screen, communicating with the application server to retrieve the selected application over a communication link between the client device of the application server;

the method further comprising: subsequent to retrieving the selected application from the application server, installing the selected application on the client device.

2. The method as in claim 1, wherein the application server utilizes a copy of the configuration information as provided by the network administrator to map the group identifier value to the corresponding set of applications which are available to members in the group as specified by the group identifier value.

3. The method as in claim 1, wherein the client device communicates over a wireless communication link with the first server to retrieve the group identifier value, the user being a member of the respective organization that configures the first server and the application server.

4. The method as in claim 1, wherein communicating with the first server to retrieve the group identifier value includes:

receiving, at the client device, credentials inputted by the user.

5. The method as in claim 4, wherein the network administrator of the respective organization:

i) configures the first server to provide, to the client device, the group identifier value indicating the group to which the user belongs, and ii) configures the application server with the access rights information indicating the set of at least one application to which members assigned the group identifier value have been granted access rights.

6. The method as in claim 1, wherein the client device receives the group identifier value over a first secured link from the first server, the first secured link extending between the first server and the client device; and wherein the client device transmits the group identifier value over a second secured link between the client device and the application server that provides access to the corresponding set of applications.

7. The method as in claim 1 further comprising:

receiving metadata associated with the user from the first server over a first secured communication link between the client device and the first server; and conveying the metadata over a second secured communication link between the client device and the application server to update configuration information associated with the user at the application server.

8. Non-transitory computer-readable storage media having instructions stored thereon for processing data information, such that the instructions, when carried out by computer processor hardware, cause the computer processor hardware to perform operations of:

forwarding credentials from a client device to a first server to satisfy the first server that a user of the client device is an authorized employee of a respective organization, the first server being an authentication server, the respective organization in control of disseminating applications from an application server;

subsequent to forwarding the credentials, communicating with the first server to retrieve configuration information assigned to the user of the client device, the configuration information including a group identifier value indicating a group to which the user belongs, the first server providing access to a repository within a firewall of the respective organization to which the user belongs, the repository within the firewall accessed by the first server to retrieve and forward the configuration information to the user;

transmitting the retrieved configuration information from the client device to the application server, the configuration information indicating to the application server of a corresponding set of applications in which to provide the user access, the application server utilizing the configuration information to identify the corresponding set of applications that are accessible to the user;

in response to transmitting the configuration information to the application server, receiving access to the corresponding set of applications from the application server through the client device;

wherein the client device transmits the configuration information to the application server to indicate that the user is a member of the group as specified by the group identifier value;

wherein a network administrator of the respective organization produces and supplies the configuration information to the repository within the firewall for distribution of the configuration information by the first server;

wherein the network administrator supplies the configuration information to the application server; and wherein the application server provides the user access to the corresponding set of applications stored in a repository located external to the firewall, the application server providing the user access as specified by the configuration information;

wherein receiving access to the corresponding set of applications further comprises:

at the client device: receiving identities of the corresponding set of applications available to the user of the client device;

initiating display of the identities on a respective display screen of the client device; and in response to receiving selection of an identity of a particular application displayed on the respective display screen, communicating with the application server to retrieve the selected application over a communication link between the client device of the application server;

the computer processor hardware further performing operations of: subsequent to retrieving the selected application from the application server, installing the selected application on the client device.

9. Non-transitory computer-readable storage media as in claim 8, wherein the application server utilizes the configuration information provided by the network administrator to map the group identifier value to the corresponding set of applications which are available to members in the group as specified by the group identifier value.

10. Non-transitory computer-readable storage media as in claim 8, wherein communicating with the first server to retrieve the group identifier value includes:
- receiving, at the client device, credentials inputted by the user.

11. Non-transitory computer-readable storage media as in claim 8, wherein the network administrator of the respective organization:
- i) configures the first server to provide, to the client device, the group identifier value indicating the group to which the user belongs, and
- ii) configures the application server with the access rights information indicating the set of at least one application to which members assigned the group identifier value have been granted access rights.

* * * * *